United States Patent [19]

Schneider et al.

[11] Patent Number: 4,859,728
[45] Date of Patent: Aug. 22, 1989

[54] PASTY PIGMENT FORMULATIONS, PRODUCTION AND USE THEREOF

[75] Inventors: Manfred Schneider, Eppstein/Taunus; Ulrich Ott, Liederbach; Alexander Sieber, Frankfurt am Main; Manfred Zimmermann, Offenbach/Main, all of Fed. Rep. of Germany

[73] Assignee: Hoechst Aktiengesellschaft, Frankfurt am Main, Fed. Rep. of Germany

[21] Appl. No.: 163,766

[22] Filed: Mar. 3, 1988

[30] Foreign Application Priority Data

Mar. 5, 1987 [DE] Fed. Rep. of Germany ....... 3707020

[51] Int. Cl.$^4$ ................................................. C08K 5/41
[52] U.S. Cl. ................................... 524/159; 524/270; 523/351
[58] Field of Search ............................... 524/159, 270

[56] References Cited

U.S. PATENT DOCUMENTS 3,950,288 4/1976 Herbst et al. ...................... 524/159

OTHER PUBLICATIONS

B. K. Winnacker et al, *Chemische Technologie*, 3rd Ed., vol. 4, Carl Hanser Verlag, Munich, 1972, pp. 362, 375-376, 408.
"The Chemistry of Organic Film Formers", D. H. Solomon, John Wiley & Sons, Inc., New York, 1967 (pp. 300-305).

*Primary Examiner*—Lewis T. Jacobs

[57] ABSTRACT

There is a demand for arylpararosanililinesulfonic acid pigments which, even when the pigment content is relatively low, produce on dilution with customary printing varnishes a printing ink having satisfactory rheological properties. The invention relates to such pasty pigment formulations containing (a) 5 to 50% by weight of an arylpararosanilinesulfonic acid pigment,
(b) a long-oil alkyd resin having an oil content of 70-80% by weight whose oil content is based on the reaction with a drying, semidrying or nondrying oil or with a mixture of a plurality of these oils or with corresponding fatty acids whose dicarboxylic acid compontent is a mixture of isophthalic and orthophthalic acid, a small proportion of one or more α,β-unsaturated dicarboxylic acids and, possibly, anhydrides thereof and whose polyalcohol component contains a mixture of glycerol and pentaerythritol,
(c) a hydrocarbon resin having an average molecular weight within the range from 600 to 1700, the amount of which is 1–1.5 times that of alkyd resin b,
(d) a phenolic resin modified colophony resin or a cyclized rubber resin or combinations of the two resins and also
(e) mineral oil.

The formulations are produced analogously to conventional flush pastes consisting of components a, b, c and e, except that in the flushing process, before or during the removal of the remaining water, the resin of component d is added and incorporated.

20 Claims, No Drawings

PASTY PIGMENT FORMULATIONS, PRODUCTION AND USE THEREOF

Description

Pasty pigment formulations, production and use thereof

The present invention relates to arylpararosanilinesulfonic acid pigment formulations which are suitable in particular for producing printing inks, in particular letterpress and offset printing inks.

It is common knowledge to subject aqueous presscakes of pigments from the series of the arylpararosanilinesulfonic acids of the formula I

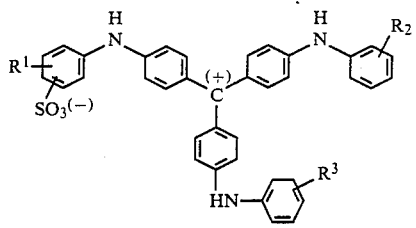

in which $R^1$, $R^2$ and $R^3$ independently of each other denote hydrogen, halogen, such as chlorine or bromine, $C_1$–$C_3$-alkyl, alkyl, $C_1$–$C_3$-alkoxy or nitro, to a flushing process, in which the pigment is transferred into a binder and at the same time substantially dewatered and also concentrated (see, for example, B. K. Winnacker, L Kuchler "Chemische Technologie" [Chemical Technology], 3rd edition, volume 4, pages 362, 375, 376 and 408 (1972)). The products obtained in this way are flush concentrates which contain the pigment in efficiently dispersed form and which are readily incorporable in a letterpress or offset printing varnish to produce strong letterpress or offset inks.

The use of flush concentrates in place of pigment powders for the production of printing inks is a particular advantage in the case of arylpararosanilinesulfonic acid pigments. This is because if the aqueous pigment presscakes are dried, as is customary with many other pigments, the results with the arylpararosanilinesulfonic acid pigments mentioned, owing to their pronounced polarity, are hard agglomerates which are no longer disintegrable for the production of the corresponding print pastes by the normal mechanical stress of grinding in a three-roll mill. The poor dispersibility of the pigments has an adverse effect on the color strength, the homogeneity, the gloss and the transparency of the printing inks. The dried, unformulated arylpararosanilinesulfonic acid pigments are therefore not usable as such for application in printing inks. The flushed pigments (flush pastes), given a suitable choice of binder, do not have this disadvantage.

The binders predominantly used for flushing arylpararosanilinesulfonic acid pigments consist of a resin mixture and high-boiling mineral oil. Binders of this type are described in DT-2,354,225-B2 (U.S. Pat. No. 3,950,288). They comprise resin mixtures in mineral oils where the mineral oil content ranges from 35 to 60% by weight. The resin mixtures have a composition such that during the kneading of the flushing process good pigment wetting is brought about. However, the wetting properties of this resin mixture must not be so pronounced as to emulsify the previously eliminated water to any significant degree, which would strongly impair the flushing process.

The arylpararosanilinesulfonic acid pigment flush pastes produced with the binders mentioned customarily have a pigment content of 40–45% and a viscosity within the range 30–70 pascal seconds (Pas), measured with a falling rod viscometer. Flush paste viscosities within the range 30–70 Pas have become widely established in practice, since on the one hand they ensure good handling of the flush pastes and on the other the pastes so formulated can be used to produce offset printing inks which meet application requirements in respect of rheology, tackiness, water compatibility and printability.

However, the use of the flush pastes mentioned for printing-ink production also has disadvantages. For instance, the change in color strength on diluting the flush pastes in a printing varnish depends not only on the nature of the printing varnish but also on the nature and amount of binder present in the flush paste. Owing to different printing ink formulations from the printing ink producers the change in color strength on diluting the flush pastes is not uniform. This fact can lead to substantial formulation problems in printing ink production, since the formulations are usually based on a very specific color strength/dilution ratio. The existing flush pastes, produced with binders such as those described in DT-2,354,225-B2, in many cases leave something to be desired as regards adaptability to the particular requirements. If an attempt is made to vary these properties of the flush pastes by reducing the pigment content and hence increasing the resin content, the rheology of the flush paste is changed by the mineral oil present in the resin from production in the direction of lower viscosity and tackiness. Processing low-pigmented flush pastes (having a pigment content of less than 40%) into a printing ink printable on customary off-set machines by blending as usual with a printing varnish is then no longer possible. This results in extremely thin printing inks having no tackiness and of very low viscosity, which gives rise to substantial problems in printing, with the absorption into the paper, with the ink/water equilibrium and with the abrasion resistance and the scuff resistance.

There is therefore a demand for arylpararosanilinesulfonic acid pigment flush pastes which are producible in a wide range of pigment contents and hence make possible better adaptation to predetermined property profiles, for example in respect of hue, color strength and rheology. More particularly, such flush pastes of low pigment content shall, upon dilution with a customary printing varnish, give a printing ink having satisfactory rheological properties.

The present invention provides pasty pigment formulations containing (a) 5 to 50% by weight of one or more pigments of the general formula I

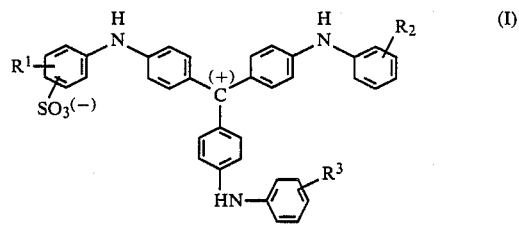

in which $R^1$, $R^2$ and $R^3$ independently of each other denote hydrogen, halogen, such as chlorine or bromine, $C_1$–$C_3$-alkyl, $C_1$–$C_3$-alkoxy or nitro, (b) a long-oil alkyd resin having an oil content of 70–80% by weight whose oil content is based on the reaction with a drying, semidrying or nondrying oil or with a mixture of a plurality of these oils or with corresponding fatty acids whose dicarboxylic acid component is a mixture of isophthalic acid and orthophthalic acid, a small proportion of one or more $\alpha,\beta$-unsaturated dicarboxylic acids and, possibly, anhydrides thereof and whose polyalcohol component contains a mixture of glycerol and pentaerythritol, (c) a hydrocarbon resin having an average molecular weight within the range from 600 to 1700, the amount of which is 1–1.5 times that of alkyd resin b, (d) a phenolic resin modified colophony resin or a cyclized rubber resin or combinations of the two resins and also (e) mineral oil.

Particular interest is given to pigment formulations according to the invention comprising 20–38% by weight of pigment, 20–45% by weight of a resin mixture of the above-defined components b and c, 3–25% by weight, preferably 5–15% by weight, of phenol modified colophony resin or cyclized rubber resin or mixtures of the two resins, and also 10–40, in particular 15–25, % by weight of mineral oil.

Preferred pigment formulations contain pigments of the abovementioned general formula I where $R^1$, $R^2$ and $R^3$ independently of each other denote hydrogen, methyl, ethyl, n- or iso-propyl, in particular hydrogen or methyl. Examples of pigments of the formula I are pigments listed in the Colour Index as Pigment Blue 19, Pigment Blue 56, Pigment Blue 57 and Pigment Blue 61.

The pigment formulations according to the invention contain a long-oil alkyd resin (component b) having an oil content of 70–80% by weight, preferably 75–77% by weight, in combination with 1–1.5 times, preferably 1–1.25 times the amount of one or more hydrocarbon resins having an average molecular weight within the range 600–1700.

The long-oil alkyd resins of component b can be prepared in a conventional manner as oil modified or fatty acid modified polyesters by reacting isophthalic and orthophthalic acid and also small amounts of one or more $\alpha,\beta$-unsaturated dicarboxylic acids with a mixture of glycerol and pentaerythritol and oils or fatty acids or combinations thereof in one or more steps.

Suitable oils for preparing the long-oil alkyd resins are, for example, linseed oil, castor oil, coconut oil, ricinenic oil, sunflower oil, cottonseed oil, soybean oil, peanut oil, tall oil and tallow oil, preferably linseed oil or castor oil, and also combinations of the oils mentioned. If fatty acids are used for preparing the long-oil alkyd resins, suitable fatty acids and fatty acid mixtures are, for example, those obtainable by saponification of the aforementioned oils. Also suitable are straight-chain or branched saturated fatty acids having 7–10 carbon atoms, fatty acids from the hydrolysis of fats, in particular bovine tallow fat, resin acids, benzoic acid, p-tert-butylbenzoic acid and combinations of the acids mentioned.

An "oil content" is mentioned not only in connection with the alkyd resins prepared using the abovementioned oils but also in connection with the alkyd resins prepared using the abovementioned fatty acids. This so-called oil content is defined as the proportion by weight, based on the alkyd resin, of the modifying oils or fatty acids, counted as triglycerides, which are used in the preparation of the alkyd resin.

The hydrocarbon resin of component c of the pigment formulations according to the invention can consist of a hydrocarbon resin or a mixture of hydrocarbon resins, the average molecular weight of each resin being within the range 600–1700. Preferably the hydrocarbon resin of component c consists of a mixture of two hydrocarbon resins, of which one has an average molecular weight between 600 and 1100 and the other has an average molecular weight between 1400 and 1700.

Suitable combinations of resins of components b and c of the pigment formulations according to the invention are known from DT-2,354,225-B2 (U.S. Pat. No. 3,950,288). Their solutions in mineral oil are suitable for flushing aqueous presscakes of pigments of the formula I.

Component d of the pigment formulations to be used according to the invention can comprise phenol modified colophony resins. Preferred phenol modified colophony resins have a melting point of 110–180° C., in particular 120–165° C., an acid number within the range of about 20–110 and a dynamic viscosity as defined in German Standard Specification DIN 53,177 of 50–450 mPas, in particular 50–230 mPas (mPas = millipascal second) at 20° C. in 50% strength toluene solution. Suitable commerically available resins of this type are for example ®ALBERTOL KP 626 (HOECHST AG), ®ALBERTOL KP 823, ®ALBERTOL KP 172 AND ®ALBERTOL KP 330.

Component d to be used can also comprise cyclized rubber resins. Suitable cyclized rubber resins in general have a melting point within the range 100–150° C., a dynamic viscosity as defined in German Standard Specification DIN 53,177 of 50–5000 mPas, preferably 100–180 mPas (20° C., 50% strength solution in toluene), and an acid number of less than 5 (see for example the disclosure in Kirk-Othmer "Encyclopedia of Chemical Technology", Second Edition (1968), Volume 17, pages 651–655; and D. H. Solomon "The Chemistry of Organic Film formers", 1967, Chapter 12, page 300 et seq).

Component e of the pigment formulations according to the invention comprises mineral oil. The mineral oil can be aromatics-containing or aromatics-free mineral oil and generally has a boiling range between 200 and 530° C.

The pigment formulations according to the invention, in addition to components a–e, may contain customary auxiliaries as further components. Customary auxiliaries are for example preservatives, such as fungicides, or amines as flushing aids.

The present invention also provides the process for producing the pigment formulation according to the invention containing essentially the abovementioned components a–e by flushing the aqueous presscakes of one or more pigments of the abovementioned formula I, which comprises flushing the aqueous presscakes of the pigment or pigments in the presence of a solution of a resin mixture in mineral oil, the resin mixture comprising a resin of the type defined as component b and 1 to 1.5 times the amount of a resin of the type defined as component c and the mineral oil conforming to component e, and before or during the removal of the remaining water adding, and incorporating, the resin or the resin mixture of component d with or without further mineral oil conforming to component e and/or further solution of the resin mixture of the resins of components b and c in mineral oil, and removing the remaining water.

In general, the procedure comprises flushing the water-moist presscakes in a conventional manner in stages by means of divided trough kneaders of conventional design with a solution in mineral oil of the resins mentioned under components b and c and separating off the water eliminated in the course of flushing. The ratio of components b+c : component e in flusing is preferably within the range from 4:1 to 0.7:1, in particular 2.3:1 to 0.8:1. Thereafter the pigment paste formed has added to it, directly in the kneader, the amount of resin listed under component d which is required to obtain the desired rheological properties for the flush paste. The amount of resin required is best determined in preliminary experiments, since the viscosity and the pigment content change not only during the incorporation of the resins but also during the removal of the remaining water. If the amount of mineral oil present in the pigment paste should not be sufficient to solubilize the resin of component d, further mineral oil may be added as necessary. It is also possible to add the resin of component d in the form of a solution in mineral oil; however, this should only be done in exceptional cases, since from a production engineering viewpoint it is generally more expensive. The amounts of resin and, if necessary, further mineral oil added need to be adjusted in such a way as to ensure optimal kneading and cohesion of the flush paste at all times. To standardize the flush paste to a low pigment content it is possible, after incorporation of the resin of component d, to dilute, to a certain extent, with further mineral oil or with further solution of components b and c in mineral oil.

After flushing, the bulk of the water present in the aqueous pigment presscakes has been eliminated. The removal of the remaining water can be effected in a conventional manner under reduced pressure. Preferably, the drying of the flush paste and the incorportion of the resin of component d take place in parallel.

The present invention also provides a method of using the pigment formulations according to the invention for producing printing inks. The arylpararosanilinesulfonic acid pigment flush pastes according to the invention are distinguished by excellent properties which qualify such pastes in particular for use in the production of letterpress and offset printing inks. For instance, the pigment formulations generally have a tackiness within the range 8–30, preferably 9–18, inkometer points and, on dilution in a customary printing varnish, they produce printing inks having a tackiness of 8–18, preferably 9–14, inkometer points, as required for letterpress and offset printing inks. Tackiness is here measured in terms of the torque transferred by a roll coated with the formulation to an undriven roll in contact with the first roll, due to the tackiness of the formulation (1 inkometer point =60 cm ×pond). The inkometer value is an instrument-specific value and relates to the "Inkomat" tackometer from Prufbau (Munich). The viscosities of the printing inks after dilution of the flush pastes in a ratio of 1:1 with a customary printing varnish are preferably within the range 10–50 Pas, in particular 20–40 Pas, and are highly suitable for printing on offset printing presses.

The pigment formulations according to the invention are safely storable. Even after prolonged storage at 50–60° C. the pigment formulations have a stable viscosity within the range 50–350 Pas and are readily processible. The pigment formulations according to the invention can be produced with pigment contents of up to 50% by weight. Preference is given to pigment contents of 20–38% by weight. By using different amounts of resins of component d the dependence of the color strength on the dilution ratio used for incorporation into a printing varnish can be controlled within wide limits.

The pigment formulations according to the invention are distinguished by very broad compatibility with the binder and printing ink systems customary for the various printing processes, such as letterpress and planographic printing, suitable in single-color or multicolor printing technology. For instance, they are easily incorporable in binder systems for letterpress inks, offset inks, heatset offset inks or rotary newsprint inks. The printing inks pigmented with the formulations according to the invention are satisfactorily printable and produce strong glossy prints. The pigment formulations according to the invention are also suitable in mixture with black pastes for use as a printing color and in printing have a good gloss and toning effect. The pigment formulations are also suitable for producing printing inks for manifolding papers and ink ribbons.

In the examples which follow, parts and percentages are by weight, unless otherwise stated. In some instances in the examples the structures of the pigments used are shown in the form of an idealized formula. In these cases the pigment used contains a mixture of triarylpararosanilinemonosulfonic acids, which are formed together in the sulfonation of the corresponding triarylpararosaniline and which differ from each other in having the sulfo group bonded to one of the structurally different terminal aryl radicals.

EXAMPLE 1

240 parts of the pigment of triphenyl-pararosanilinemonosulfonic acid of the idealized formula II

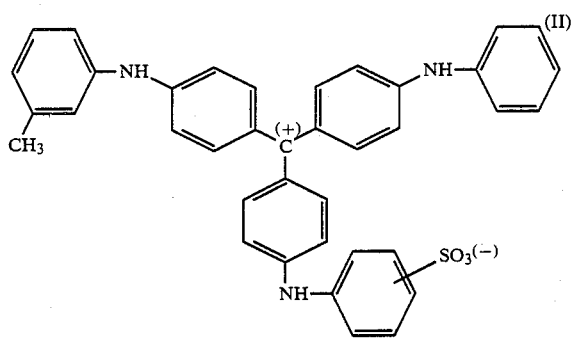

are flushed as an aqueous presscake (937 parts) having a pigment content of 25.6% by weight with 250 parts of an approximately 70% strength flush resin solution in a kneader having sigma-shaped kneader blades, flushing resin solution having been prepared analogously to binder A of DT-2,354,225-B2 (U.S. Pat. No. 3,950,288). In this flushing process, first 547 parts of the moist presscake are kneaded with 160 parts of the 70% strength flush resin solution, and after about 20 minutes 270 parts of water are separated off by tilting the kneader. After addition of 195 parts of the moist presscake and slow dropwise addition of 40 parts of flush resin solution, 70 parts of water are eliminated in a second flush. After the water has been separated off, a third flush is carried out by adding the remaining 195 parts of the presscake and by the dropwise addition of 50 parts of flush resin solution. In total, 84.6% of the water present in the presscake is separated off in this way. The knead base, which is now viscous, has kneaded into it 52 parts of a phenolic resin modified colophony resin (®ALBERTOL KP 626) having a melting range of 120–130° C. and an acid number of 34 together with the dropwise addition of 140 parts of a flush resin solution of the type mentioned at the beginning, and the remaining water is drawn off under reduced pressure. After 6–7 hours of kneading in vacuo the paste is substantially water-free, and the added resin has been homogeneously distributed in the paste. By further addition of 50 parts of flush resin solution a little at a time, the paste is standardized to a viscosity of 170 Pas. The pigment content of the ready-prepared paste is about 33%. Dilution of the paste with a customary offset printing ink varnish gives a printing ink having a viscosity of 26 Pas and a tack of 12.7 inkometer points.

EXAMPLE 2 (COMPARATIVE EXAMPLE)

Example 1 is repeated, except that after the three flushes the flush paste is gradually diluted down with the flush resin solution. When the pigment content is less than 40%, the viscosity of the paste is so low (<20 Pas) that standardizing the paste with the same amount of a commercially available offset printing varnish produces a printing ink which has totally unsatisfactory rheological properties.

Nor does subsequent addition of the resin of the invention used in Example 1 as component d to the printing ink give properties which, in respect of rheology and color strength behavior upon dilution, correspond to the properties of the printing ink described in Example 1.

EXAMPLE 3

240 parts of the pigment of formula III

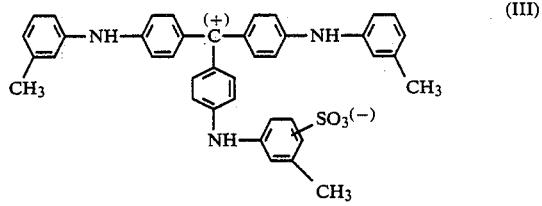

are flushed in the form of an aqueous presscake (889 parts) having a pigment content of 27% with 280 parts of flush resin solution by a procedure analogous to that of Example 1. After the flushes the moist paste has added to it 200 g of a cyclized rubber resin (melting point 115–125° C., dynamic viscosity 120–170 mPas in 50% strength toluene solution, acid number <2) and, at a rate dictated by knead consistency, about 185 parts of mineral oil. After about 5 hours under reduced pressure the paste is dry and the added cyclized rubber resin has completely dissolved. The result is a flush paste having a viscosity of 140 Pas. After dilution with the same amount of a print varnish the flush paste is processible into a printing ink which has a viscosity of 40 Pas and a tack of 14.8 inkometer points and which has excellent printing properties.

EXAMPLE 4

First, Example 1 is repeated, a total of 180 parts of the flush resin solution being required for the flushes. To the water-moist flush paste are added 155 parts of a cyclized rubber resin (melting point 128–143° C., viscosity 3–4.5 Pas, measured in 50% strength solution in white spirits, acid number <2), which is used in the form of a 40% strength solution in a mineral oil of boiling range 260–290° C. During drying under reduced pressure the flush paste has added to it, at a rate dictated by the viscosity, 105 parts of the same resin solution which was used for flushing. After about 4 hours the paste is water-free, and all the resin has become distributed in the paste. The result is a flush paste having a pigment content of 35.2% and a dynamic viscosity of 140 Pas.

The paste is dilutable with a customary printing ink varnish in a ratio of 1:1 to give a printing ink having a viscosity of 31 Pas and a tack of 13.4 inkometer points and is excellently printable.

EXAMPLE 5

First, Example 1 is repeated, a total of 210 parts of the flush resin solution being required for the flushes. To the water-moist flush paste are added 30 parts of a cyclized rubber resin (melting point 120–127° C., viscosity 130–170 mPas measured in 50% strength solution in toluene, acid number <2) and 60 parts of a phenolic resin-modified colophony resin (melting point 140–150° C., acid number 32) and, at a rate dictated by the knead consistency during the drying under reduced pressure first 80 parts of the flush resin solution and then a further 80 parts of low-aromatics mineral oil. After 7 hours under reduced pressure the paste is completely dry, and the two added resins have become dissolved. The result is a flush paste having a viscosity of 210 Pas and a pigment content of 34.3%. After dilution with the same amount of a customary offset printing varnish the paste has 31 Pas and a tack of 12.9 inkometer points and is highly suitable for use as a printing ink.

We claim:
1. A pasty pigment formulation containing
    (a) 5 to 50% by weight of one or more pigments of the general formula I

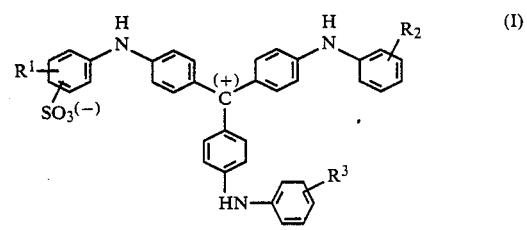

in which $R^1$, $R^2$ and $R^3$ independently of each other denote hydrogen, halogen, $C_1$–$C_3$-alkyl, $C_1$–$C_3$-alkoxy or nitro,
    (b) a long oily alkyd resin, based on a polyester, having an oil content of 70–80% by weight, whose oil content originates from the modification of the polyester with a drying, semidrying or nondrying oil or a mixture of at least two of these oils or corresponding fatty acids or combinations thereof, the dicarboxylic acid component of the polyester being a mixture of isophthalic acid and orthophthalic acid, a small proportion of one or more $\alpha,\beta$-unsaturated dicarboxylic acids or corresponding anhydrides or combinations thereof and the polyalcohol component being a mixture of glycerol and pentaerythritol, (c) a hydrocarbon resin or mixture of hydrocarbon resins having an average molecular weight within the range from 600 to 1700, the amount of which is 1-1.5 times that of alkyd resin b, (d) a phenolic resin modified colophony resin or a cyclized rubber resin or combinations of the two resins and also (e) a mineral oil having a boiling range between 200°anc 530° C.

2. A pigment formulation as claimed in claim 1, containing
(a) 20-38 % by weight of pigment,
(b) and (c) 20-45 % by weight of a resin mixture of the resins of component b and c defined in claim 1,
(d) 3-25 % by weight of phenol resin modified colophony resin or cyclized rubber resin or mixtures of the two resins,
(e) 10-40 % by weight of mineral oil.

3. A pigment formulation as claimed in claim 1, containing a phenolic resin modified colophony resin of component d which has a dynamic viscosity of 50-450 mPas.

4. A pigment formulation as claimed in claim 3, wherein the dynamic viscosity of component d is 50-230 mPas.

5. A pigment formulation as claimed in claim 1, containing a cyclized rubber resin of component d which has a dynamic viscosity of 50-5000 mPas.

6. A pigment formulation as claimed in claim 5, wherein the dynamic viscosity of component d is 100-180 mPas.

7. A pigment formulation prepared by flushing an aqueous presscake of one or more pigments
(a) of the general formula I

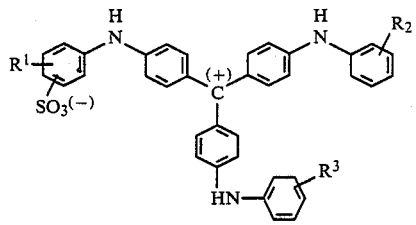

in which $R^1$, $R^2$ and $R^3$ independently of each other denote hydrogen, halogen, $C_1$-$C_3$-alkyl, $C_1$-$C_3$-alkoxy or nitro, in the presence of a solution of a resin mixture in a mineral oil conforming to component e), the resin mixture comprising the components (b) a long oily alkyd resin, based on a polyester, having an oil content of 70-80% by weight, whose oil content originates from the modification of the polyester with a drying, semidrying or nondrying oil or a mixture of at least two of these oils or corresponding fatty acids or combinations thereof the dicarboxylic acid component of the polyester being a mixture of isophthalic acid and orthophthalic acid, a small proportion of one or more $\alpha,\beta$ unsaturated dicarboxylic acids or corresponding anhydrides thereof and the polyalcohol component being a mixture of glycerol and pentaerythritol, and (c) a hydrocarbon resin or mixture of hydrocarbon resins having an average molecular weight within the range from 600 to 1700, the amount of which is 1-1.5 times that of alkyd resin b, and adding and incorporating the flush paste thus formed before or during the removal of the eliminated water (d) a phenolic resin modified colophony resin or a cyclized rubber resin or combinations of the two resins, with or without further mineral oil of component e), either singly or together with further solution of the resin mixture of components b and c in mineral oil of component e), and separating off the remaining water.

8. A pigment formulation as claimed in claim 7, containing 20-38 % by weight of pigment, 20-45 % by weight of the resin mixture of component b and c, 3-25 % by weight of the resin or the resin mixture of component d, and 10-40 % by weight of mineral oil conforming to component e).

9. Pigment formulation as claimed in claim 7, containing a phenolic resin modified colophony resin of component d which has a dynamic viscosity of 50-450 mPas.

10. Pigment formulation as claimed in claim 9, wherein the dynamic viscosity of component d) is 50-230 mPas.

11. Pigment formulation as claimed in claim 9, containing a cyclorubber resin of component d which has a dynamic viscosity of 50-5000 mPas.

12. Pigment formulation as claimed in claim 11, wherein the dynamic viscosity of component d) is 100-180 mPas.

13. Pigment formulation as claimed in claim 7, wherein the remaining water is removed by drying under reduced pressure and the incorporation of the resin or resin mixture of component d being carried out simultaneously with the drying.

14. A process for producing a pigment formulation as defined in claim 1, containing essentially the specified components a-e, by flushing an aqueous presscake of one or more pigments of the specified formula I, which comprises flushing the aqueous presscake of the pigment or pigments in the presence of a solution of a resin mixture in mineral oil, the resin mixture comprising a resin of the type defined as component b and, calculated thereon, 1 to 1.5 times the amount of a resin of the type defined as component c and the mineral oil conforming to component e, and adding and incorporating to the flush paste thus formed, before or during the removal of the eliminated water a resin of component d separately or a combination thereof with or without further mineral oil conforming to component e either singularly or together with further solution of the resin mixture of components b and c in mineral oil of component e), and separating off the remaining water.

15. The process as claimed in claim 14, wherein the remaining water is removed by drying under reduced pressure and the incorporation of the resin or resin mixture component d being carried out simultaneously with the drying.

16. A method for pigmenting printing inks, wherein a pigment formulation as defined in claim 1 is incorporated into the printing ink.

17. The method as claimed in claim 16, wherein the printing ink is an offset printing ink.

18. The method as claimed in claim 16, wherein the pigmented printing ink has a tackiness within the range from 8 to 18 inkometer points.

19. A method as claimed in claim 18, wherein the tackiness is within the range from 9 to 14 inkometer points.

20. The method as claimed in claim 16, wherein the pigmented printing ink has a viscosity within the range from 10 to 50 Pas.

* * * * *